US008063817B2

(12) United States Patent
Christianson

(10) Patent No.: US 8,063,817 B2
(45) Date of Patent: Nov. 22, 2011

(54) METHOD FOR CROSS-RANGE ENHANCEMENT OF REAL-BEAM RADAR IMAGERY

(75) Inventor: Paul Christianson, Seattle, WA (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 12/549,074

(22) Filed: Aug. 27, 2009

(65) Prior Publication Data

US 2011/0050485 A1    Mar. 3, 2011

(51) Int. Cl.
*G01S 13/89*    (2006.01)
*G01S 13/00*    (2006.01)

(52) U.S. Cl. ........ 342/191; 342/175; 342/176; 342/179; 342/190; 342/195

(58) Field of Classification Search .......... 342/21, 342/22, 25 R–25 F, 175, 176, 179, 189–197, 342/82–103, 70–72, 159, 118, 146, 147; 375/300
See application file for complete search history.

(56) References Cited

U.S. PATENT DOCUMENTS

| | | | | |
|---|---|---|---|---|
| 5,381,152 A * | 1/1995 | Klausing | .................. | 342/25 F |
| 5,519,402 A * | 5/1996 | Kitayoshi | .................... | 342/196 |
| 5,563,604 A * | 10/1996 | Brandao et al. | ............... | 342/192 |
| 5,608,404 A * | 3/1997 | Burns et al. | .................. | 342/25 A |
| 5,630,154 A * | 5/1997 | Bolstad et al. | ................ | 342/159 |
| 5,699,067 A * | 12/1997 | Brown et al. | .................. | 342/176 |
| 6,686,870 B2 * | 2/2004 | Nishimura et al. | ............. | 342/70 |
| 6,750,804 B2 * | 6/2004 | Chen et al. | ........................ | 342/89 |
| 7,336,218 B2 * | 2/2008 | Nishimura et al. | ............. | 342/70 |
| 7,432,849 B2 * | 10/2008 | Noda | .............................. | 342/70 |
| 7,642,953 B2 * | 1/2010 | Cheng et al. | ................... | 342/179 |
| 7,782,248 B2 * | 8/2010 | Kwak et al. | ................... | 342/189 |
| 7,839,953 B2 * | 11/2010 | Shinonaga | .................... | 375/300 |

* cited by examiner

*Primary Examiner* — Bernarr Gregory
(74) *Attorney, Agent, or Firm* — Lowe Graham Jones PLLC

(57) ABSTRACT

Methods and apparatus for enhancing the resolution of a radar image in the cross-range direction. An example method includes receiving a plurality of received power samples in the cross-range dimension as the radar antenna scans and calculating a window function from the antenna beam response pattern. Then for each of a plurality of positions of the window function along the azimuth axis, multiplying the received response pattern by the window function at that position, yielding a product function for each position. Finally, the method includes calculating an estimated azimuth bin offset, resulting estimated target location, and a reflected power value corresponding to the integral of the product function from the product function of each position. A reconstructed azimuth bin array developed from the estimated target locations and reflected power values is substituted for the original received cross-range received power values, yielding a resolution-enhanced map image.

16 Claims, 12 Drawing Sheets

(12)  US 8,063,817 B2

METHOD FOR CROSS-RANGE ENHANCEMENT OF REAL-BEAM RADAR IMAGERY

BACKGROUND OF THE INVENTION

Airborne radar is used in aircraft navigation to generate a radar map of the ground in the vicinity of the aircraft. In some cases, the antenna aperture area available to an airborne radar device is limited, leading to a relatively large angular width of the antenna's main beam. The width of the beam can result in substantial "smearing" of the map imagery in the cross-range direction, especially in the case of highly reflective targets that are narrow relative to the beam width along the length of the azimuth. In some instances, image smearing can make it difficult for a pilot to identify features on the ground important for the effective use of the imagery.

Signal-processing techniques exist that improve the cross-range resolution of radar ground maps. One commonly used technique uses the gradient in Doppler frequency across the antenna's main beam to sharpen the image. But a disadvantage of this technique is that the gradient in Doppler frequency approaches zero as the pointing direction of the antenna approaches the direction of the velocity vector. Therefore, this technique carries the disadvantage of not being effective in the direction in which the aircraft is travelling.

Another technique for resolution enhancement uses monopulse radar. Processing of monopulse radar signals provides cross-range enhancement independent of direction, but unlike Doppler methods does not provide true resolution improvement. The mono-pulse technique also comes at the cost of significant additional expense and complexity.

SUMMARY OF THE INVENTION

The present invention includes a method and apparatus for enhancing the resolution of a radar image in the cross-range direction. In accordance with the invention, the method includes pointing a radar antenna in the direction of one of a plurality of azimuth directions, transmitting a radar signal, receiving a reflected radar signal, processing the reflected radar signal, repeating the steps of pointing, transmitting, receiving and processing for a plurality of azimuth directions as the antenna is scanned in azimuth, composing an array of values corresponding to the plurality of reflected radar signal power samples received and processed, and converting the array into a map image.

In accordance with another aspect of the invention, the method further includes creating a received power azimuth bin array, calculating a window function of a form similar to the antenna beam discrete target response pattern, calculating at least one product function by multiplying the function consisting of the array of received signal power samples by the window function, calculating an estimated azimuth bin offset from the mean of the product function, calculating the azimuth direction of an estimated target location from the azimuth bin offset, and adding a reflected power value corresponding to the integral of the product function to an element of a new azimuth bin array corresponding to the estimated target location.

In accordance with yet another aspect of the invention, the method further includes calculating a plurality of product functions for a plurality of positions of the window function along the azimuth, the individual product functions corresponding to individual window function positions, adding at least one reflected power value to at least one value stored in an element of the azimuth bin array, whereby the element of the new azimuth bin array corresponds to the azimuth direction of the estimated target location, and substituting a pattern of values stored in the new azimuth bin array for the received signal power samples, whereby the resolution of the map image becomes enhanced.

In accordance with the invention, the apparatus includes an antenna, a transmit circuit, a receive circuit, a map display, a control device and a processor. The processor constructs a function in the cross-range, or azimuth, dimension for a number of range bins from received radar signal samples and converts the azimuth functions for each of the ranges into a map image. In a further aspect of the invention, the processor enhances the map image resolution using the method described above.

One benefit of the method is that the method is not dependent on the direction of the velocity vector, as with Doppler resolution-enhancing methods. Another advantage is that the disclosed method can result in substantial cost savings over monopulse methods for resolution enhancement due to the invention's lower level of complexity.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
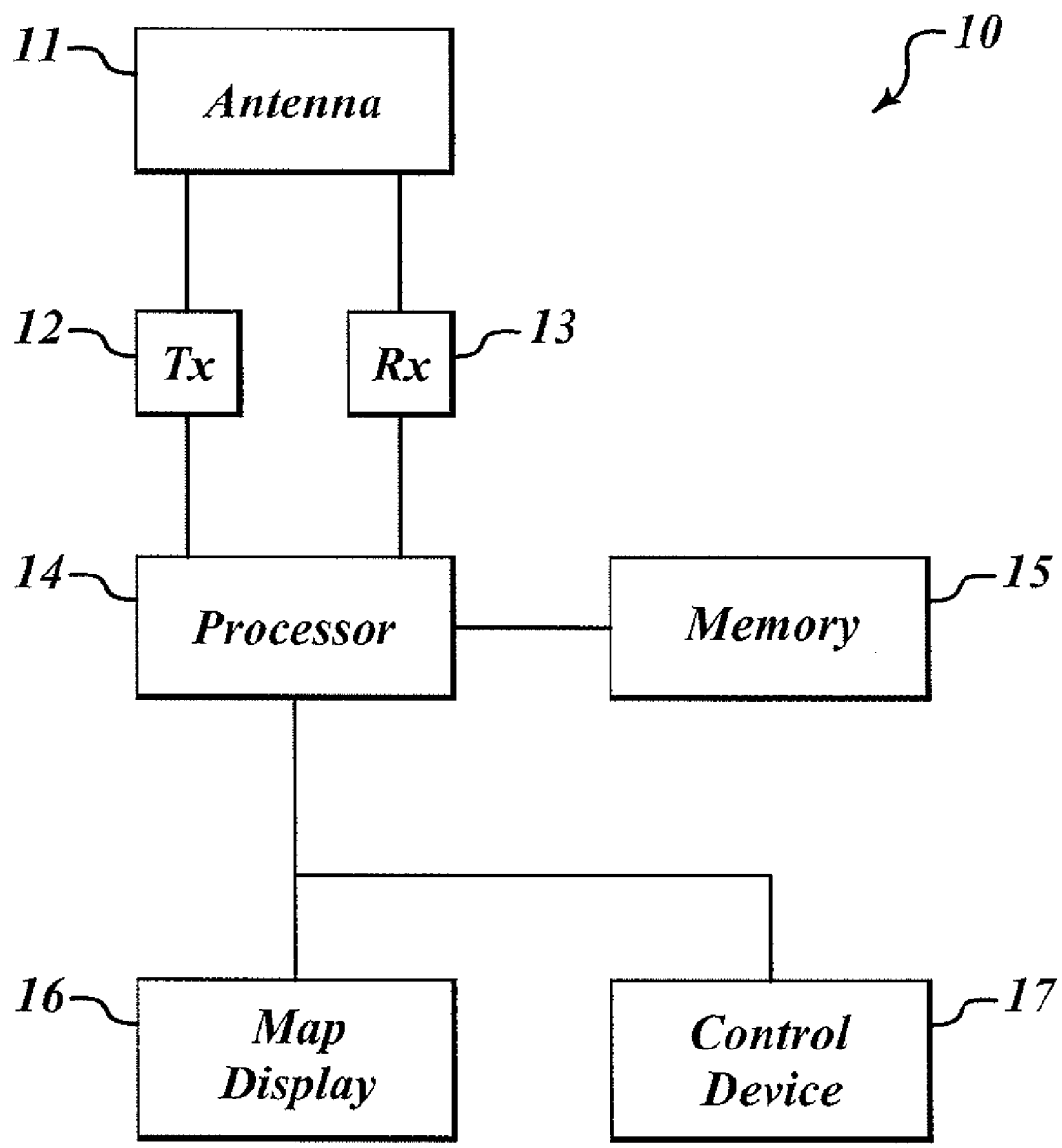
FIG. 1 shows a schematic diagram of an example airborne radar device formed in accordance with the present invention.

FIG. 1 is an example airborne radar device 10 used in aircraft navigation to generate a radar map of the ground in the vicinity of an aircraft. The airborne radar device 10 includes an antenna 11, a transmit circuit 12, a receive circuit 13, a processor 14, a memory 15, a map display 16, and a control device 17. The antenna 11 is in signal communication with the transmit circuit 12 and the receive circuit 13. The transmit circuit 12 and the receive circuit 13 are each in signal communication with the processor 14. The processor 14 is in signal communication with the memory 15, the map display 16, and the control device 17.

The airborne radar device 10 transmits and receives radar signals, converts the received radar signal into processor-interpretable data, and displays the processed image data in map form. Outgoing radar power signals generated by the transmit circuit 12 and incoming radar power signals reflected from a target are transmitted and received by the antenna 11. The received radar signal is decoded into a processor-interpretable signal by the receive circuit 13. The processor-interpretable signal is interpreted by the processor 14 in a signal processing operation that includes extraction of image data from the processor-interpretable signal. Command of the transmit circuit 12, delivery of image data to the map display 16, receipt of control parameters from the control device 17, and measures to enhance the resolution of the map image are other functions performed by the processor 14. Data and control parameters received from the processor 14 are either temporarily or permanently stored by the memory 15. Image data corresponding to the received power signal is displayed by the map display 16. Input control parameters selected by a radar operator are received by the control device 17.

Figure 2:
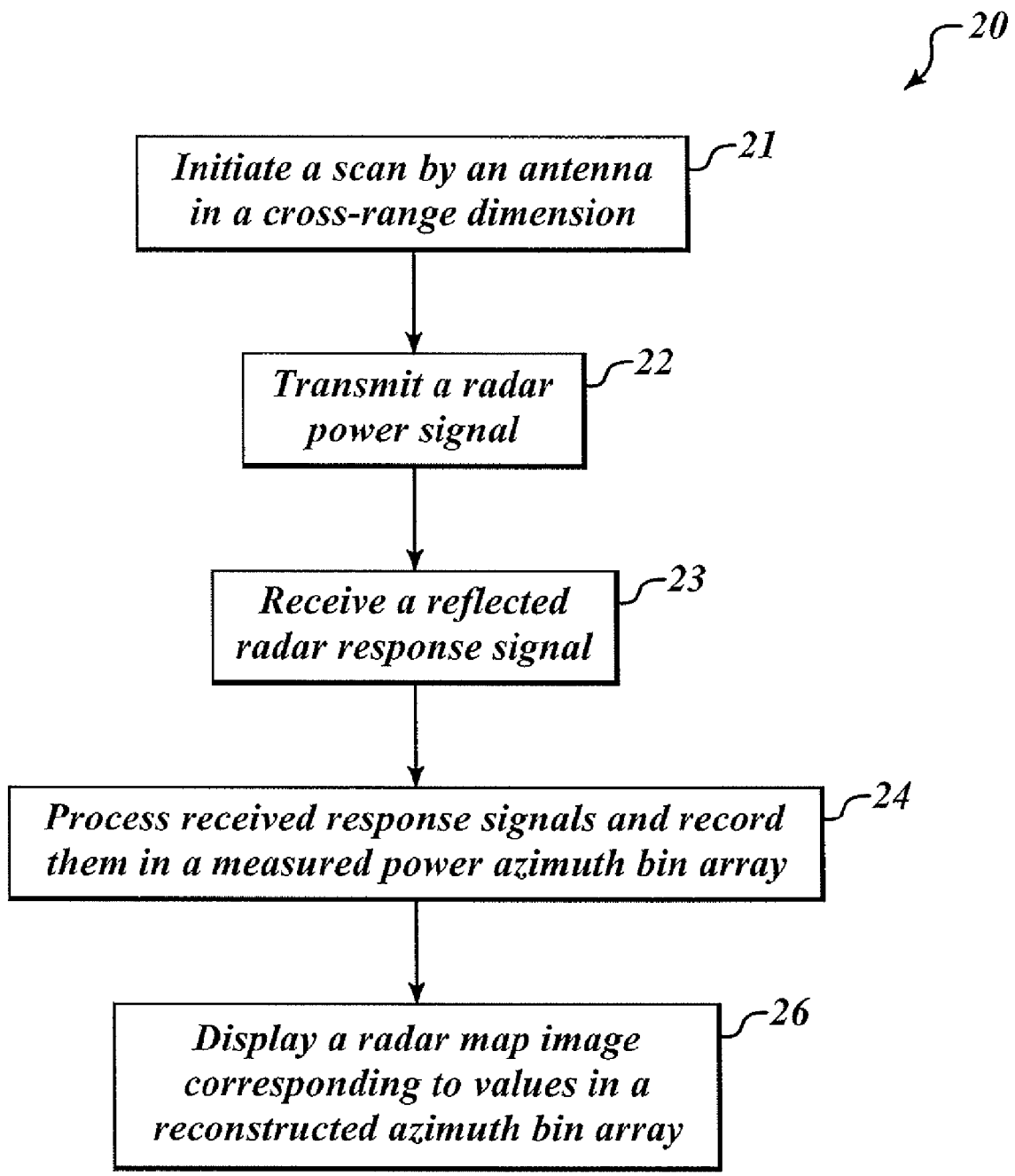
FIG. 2 shows a flow diagram of a method for creating and displaying a radar ground map as performed by the airborne radar device of FIG. 1.

As shown in FIG. 2, the airborne radar device 10 displays a radar map image according to a radar mapping method 20. At a first block 21, the radar antenna 11 initiates a scan in a cross-range, or azimuth, dimension. Next at a block 22, the antenna 11 transmits a radar power signal in the direction of the scanned azimuth of block 21. Next at a block 23, while still scanning the azimuth dimension of block 21, the antenna 11 receives a reflected radar response signal. Next at a block 24, the processor 14 processes the received radar response signals of block 23 and records values in bins of a measured power azimuth bin array corresponding to the intensity of the reflected signal. Individual bins of the measured power azimuth bin array correspond to individual directions along the scanned azimuth dimension. Next at a block 26, the processor 14 converts the values of the measured power azimuth bin array into a reconstructed azimuth bin array according to an image enhancement method 28 of FIG. 3. The airborne radar device 10 displays a radar map image corresponding to the reconstructed azimuth bin array.

Figure 3:
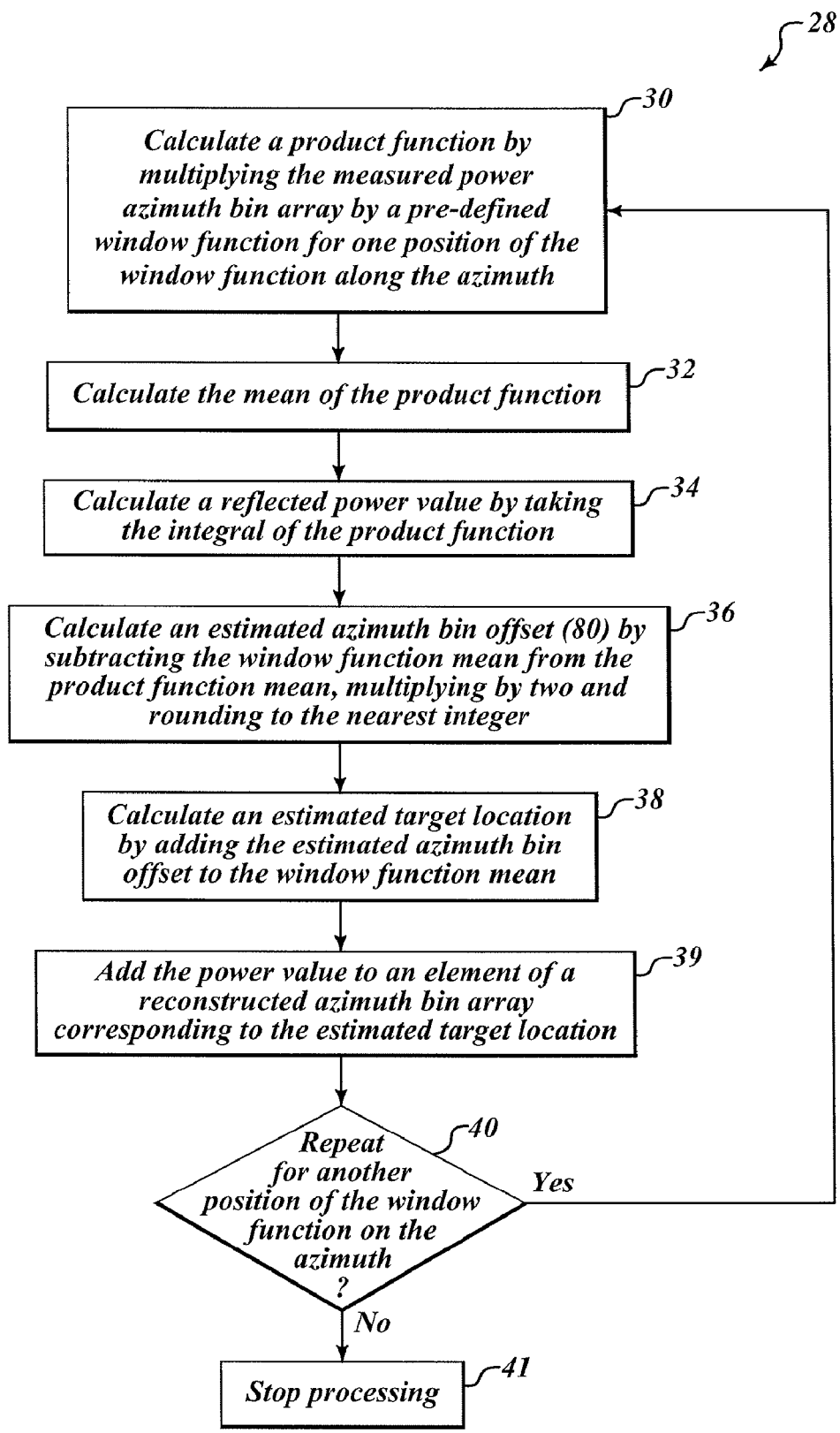
FIG. 3 shows a flow diagram of a method for resolution enhancing a radar ground map performed by the airborne radar device of FIG. 1.

As shown in FIG. 3, the processor 14 enhances the resolution of the radar map displayed in FIG. 2 by the image enhancement method 28. At a first block 30, the processor 14 calculates a product function by multiplying the measured power azimuth bin array of block 24 in FIG. 2 by a pre-defined window function for one position of the window function along the azimuth. The pre-defined window function is derived from a two-way antenna radiation pattern in azimuth. In one embodiment, the two-way antenna radiation pattern is modeled by a Gaussian function therefore, a Gaussian form for the window function is appropriate. In other embodiments another model could be used, as long as the selected function is similar to the two-way antenna main beam pattern.

Next at blocks 32 and 34, the processor 14 calculates the mean and a reflected power value of the product function. The reflected power value corresponds to the integral of the product function.

Next at a block 36, the processor 14 calculates an estimated azimuth bin offset by subtracting window function mean from the product function mean, multiplying by two, and rounding to the nearest integer. The estimated azimuth bin offset corresponds to an estimate of the distance along the azimuth between the mean of the product function and an estimate of the target location. Next at a block 38, the processor 14 calculates the estimated target location by adding the estimated azimuth bin offset to the window function mean. Next at a block 39, the processor 14 adds the reflected power value of block 34 to the bin of the reconstructed azimuth bin array corresponding to estimated target location of block 39.

Next at a decision block 40, the processor 14 either calculates another product function at the block 30 for a new position of the window function along the azimuth, or alternately at a block 41 stops processing. The degree to which image resolution improves is approximately proportional to the number of unique positions of the window function along the azimuth for which blocks 30 through 39 are executed. Therefore blocks 30 through 39 may be re-executed for subsequent positions of the window function along the azimuth in order to further improve map image resolution.

Figure 4:
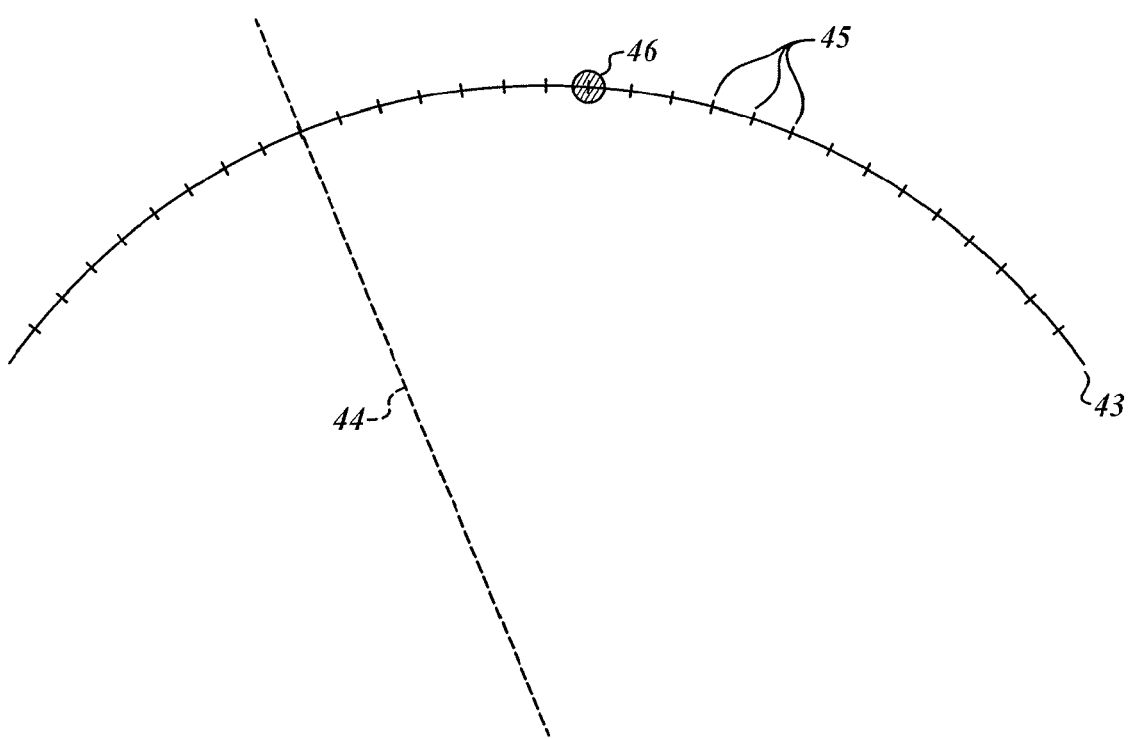
FIG. 4 shows a geometric drawing of a radar beam transmitted through an example azimuth containing a target as performed by the method of FIG. 2.

As shown in FIG. 4, a radar beam 44 is transmitted so that the beam 44 intersects one of a plurality of azimuth directions 45 along an azimuth 43. Although the radar beam 44 is pointed toward only one azimuth direction 45, the beam's width may intersect a plurality of neighboring azimuth directions 45 at one time. At each azimuth direction 45, a radar power signal is transmitted and a reflected radar response signal is received, according to blocks 22 and 23 of FIG. 2. The beam 44 then advances to a subsequent direction 45 along the azimuth 43.

Figure 5A:
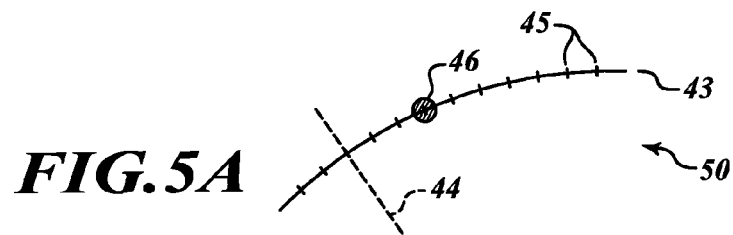
FIGS. 5A-5F show example radar beam directions subsequent to the beam direction of FIG. 4 during a radar beam sweep along the example azimuth.
Figure 5B:
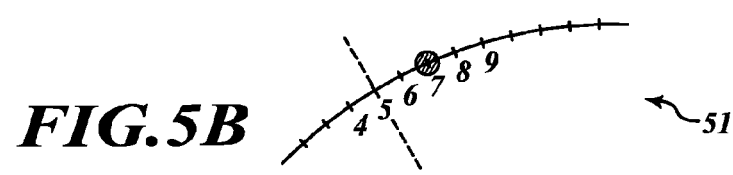
Figure 5C:
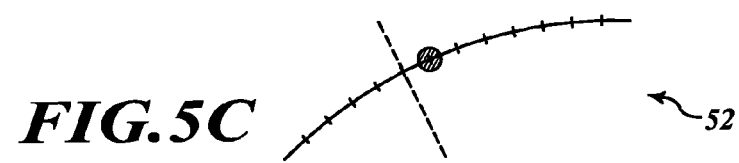
Figure 5D:
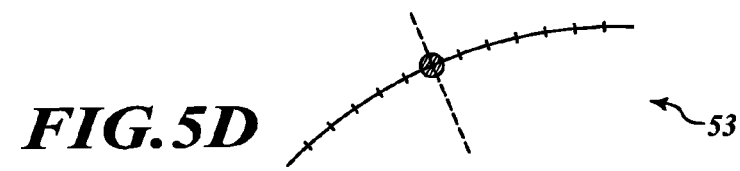
Figure 5E:
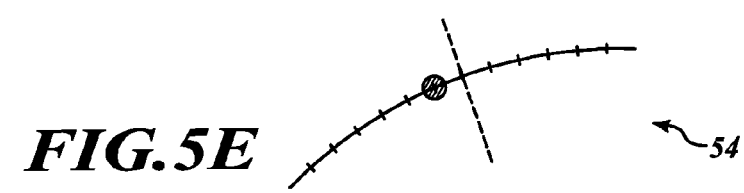
Figure 5F:
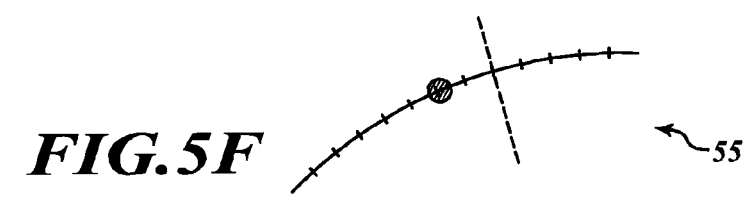

FIGS. 5A-5F exhibit six individual radar beam directions 50, 51, 52, 53, 54, 55 of the radar beam 44 of FIG. 4. Taken in succession, radar beam directions 50, 51, 52, 53, 54, 55 in FIGS. 5A-5F can be viewed as a scan of the azimuth 43 by the radar beam 44. In FIGS. 5A-5C the beam 44 approaches a target 46. In FIG. 5D the beam 44 intersects the target 46. In FIGS. 5E-5F the beam 44 moves away from the target 46. Because beam 44 has width that may include several azimuth directions 45 at one time, even at azimuth directions that do not directly intersect the target 46, the reflected response signal may still include power reflected from the target 46.

Figure 6:
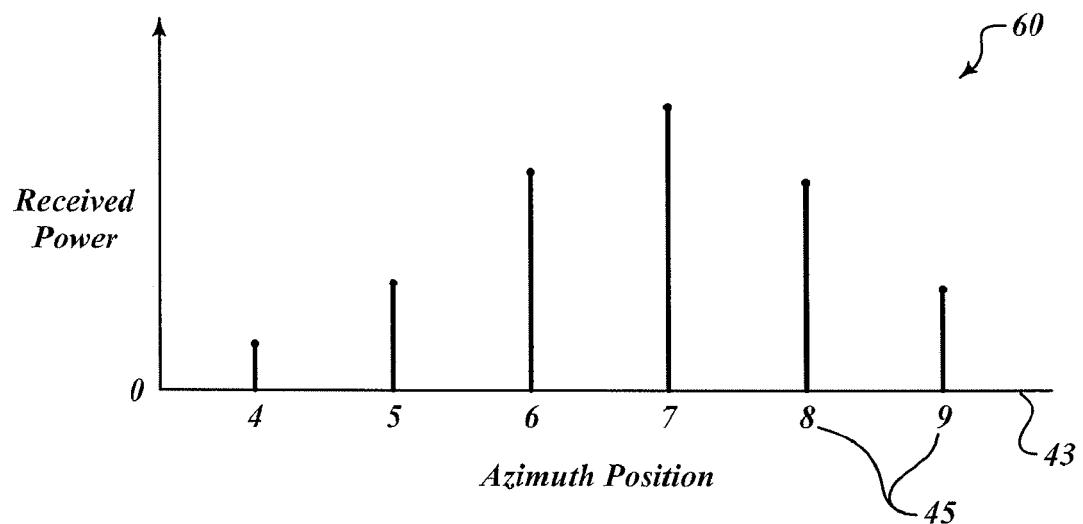
FIG. 6 shows a plot of an example measured power azimuth bin array corresponding to reflected radar signal power samples received and processed by the method of FIG. 2.

As shown in FIG. 6, the reflected radar response signals of a scan of azimuth 43 can be used to identify the approximate location of a target 46 along the azimuth. The plot of FIG. 6 shows a measured power azimuth bin array 60 corresponding to the six radar beam directions of the scan in FIGS. 5A-F. The intensity of the received (reflected) power increases the closer the radar beam is pointed to the target 46. The location of the target 46 can be identified by the highest intensity bin of the measured power azimuth bin array 60, but because neighboring bins also have received power, it's not possible to precisely identify the width and location of the target 46.

Figure 7:
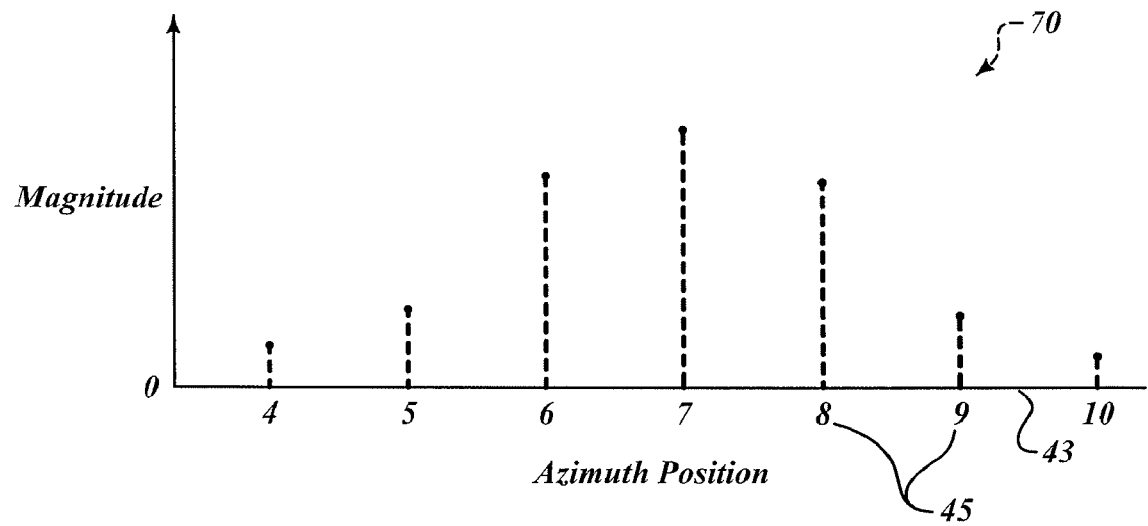
FIG. 7 shows a plot of an example window function for the measured power azimuth bin array of FIG. 6.

FIG. 7 shows a window function 70 selected to correspond with the measured power azimuth bin array 60 of FIG. 6. The window function 70 is a function that is non-negative within some chosen interval, and zero or approaching zero outside the chosen interval. By multiplying the window function 70 through the measured power azimuth bin array 60, the width and location of the target 46 can be more precisely identified, as will be shown.

Figure 8:
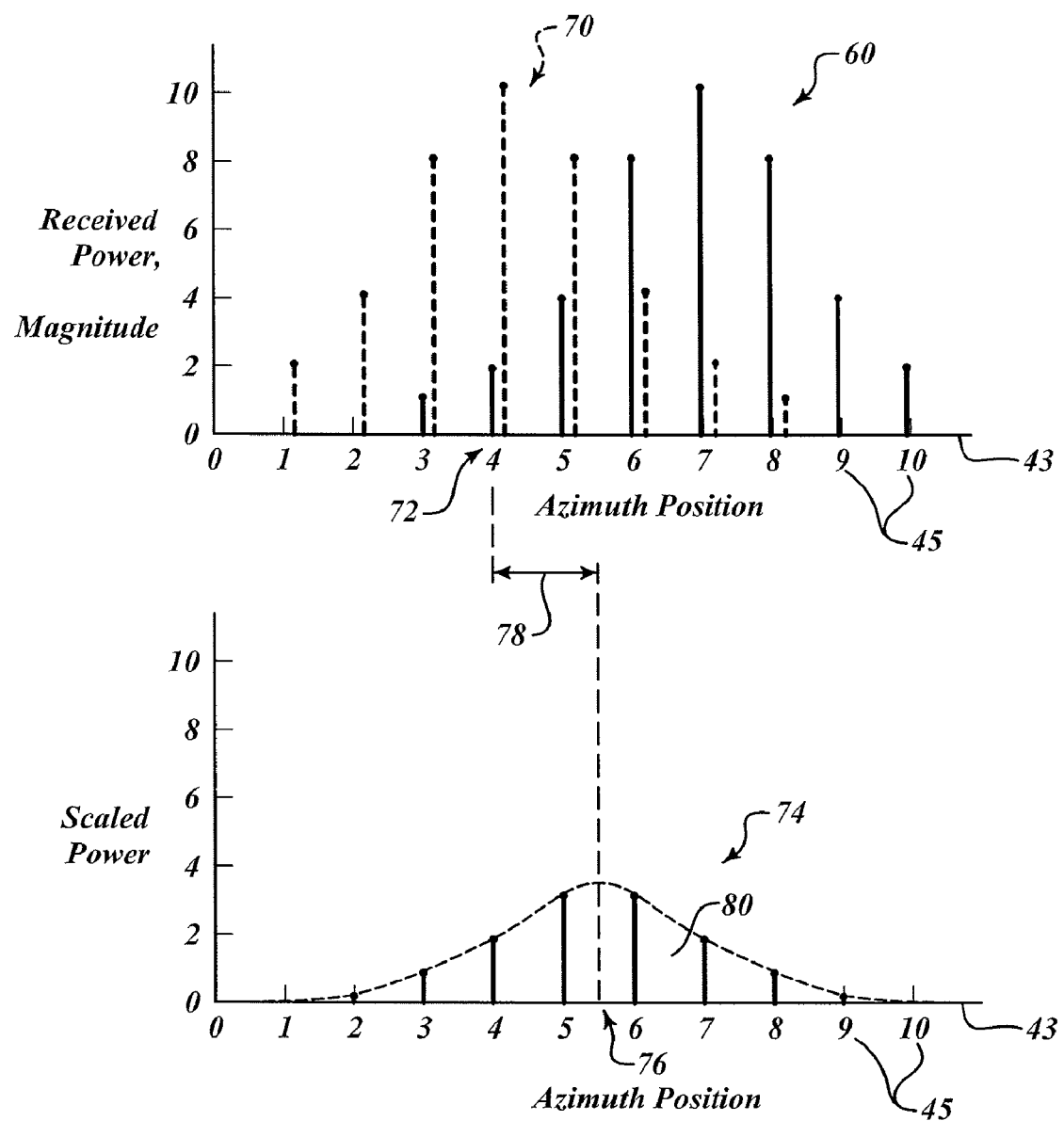
FIG. 8 shows on a first plot the measured power azimuth bin array of FIG. 6 and the window function of FIG. 7, with the window function mean positioned at azimuth direction 4, and on a second plot the product of the two functions calculated according to the method of FIG. 3.

As shown in FIG. 8, the multiplication of the measured power azimuth bin array 60 and the window function 70 produces a product function 74 that is shaped similarly to its two factors 60, 70 and has as its mean 76 an azimuth direction midway between the peaks of the two factor functions 60, 70. FIG. 8 shows this multiplication for the case where the window function 70 is positioned with its mean 72 at azimuth direction 4. The scaled power at each azimuth direction 45 of the product function 74 is the product of the received power from the azimuth bin array 60 and the magnitude of the window function 70 at each azimuth direction 45. For example, at azimuth direction 5 the received power equals four and the magnitude of the window function 70 equals eight, therefore the scaled power at azimuth direction 5 equals 32. Calculation of the product function 74 is the first operation, the block 30, of the image enhancement method 28 of FIG. 3.

FIG. 8 also shows the result of a calculation of the product function mean 76 and a reflected power value 80, as described in blocks 32 and 34 of the image enhancement method 28 of FIG. 3. The product function mean 76 is calculated by taking the mean of the product function 74. The reflected power value 80 is calculated by taking the integral of the product function 74.

From the product function mean 76 and the window function mean 72, an estimated azimuth bin offset is calculated. As shown in FIG. 8, first an intermediate offset value 78 is calculated by subtracting the window function mean 72 from the product function mean 76. The estimated azimuth bin offset 84 is then calculated from the intermediate value 78 by multiplying the intermediate offset value 78 by two, and rounding to the nearest integer. This operation coincides with block 36 of the image enhancement method 28.

Figure 9:
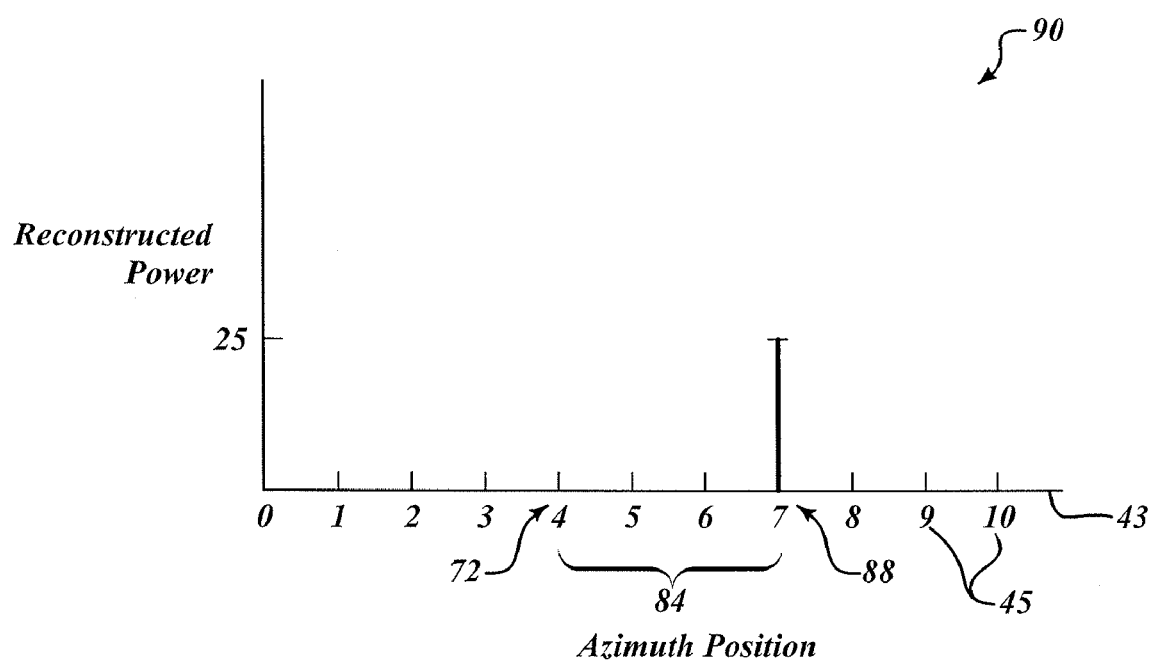
FIG. 9 shows a plot of a reconstructed power azimuth bin array of the method of FIG. 3 for the product function of FIG. 8.

From the estimated azimuth bin offset 84, an estimated target location 88 is calculated. As shown in FIG. 9, by adding the estimated azimuth bin offset 84 to the window function mean 72 of FIG. 8, the estimated target location 88 along the azimuth 43 is identified. This operation coincides with the block 38 of the image enhancement method 28.

The reflected power value 80 calculated at the block 34 is then added to a bin of a reconstructed azimuth bin array 90 coinciding with the estimated target location 88. As shown in FIG. 9, the reflected power value 80 from FIG. 8 equal to 25 is plotted at azimuth direction 7, which is the estimated target location 88. This operation coincides with the block 39 of the image enhancement method 28.

Figure 10:
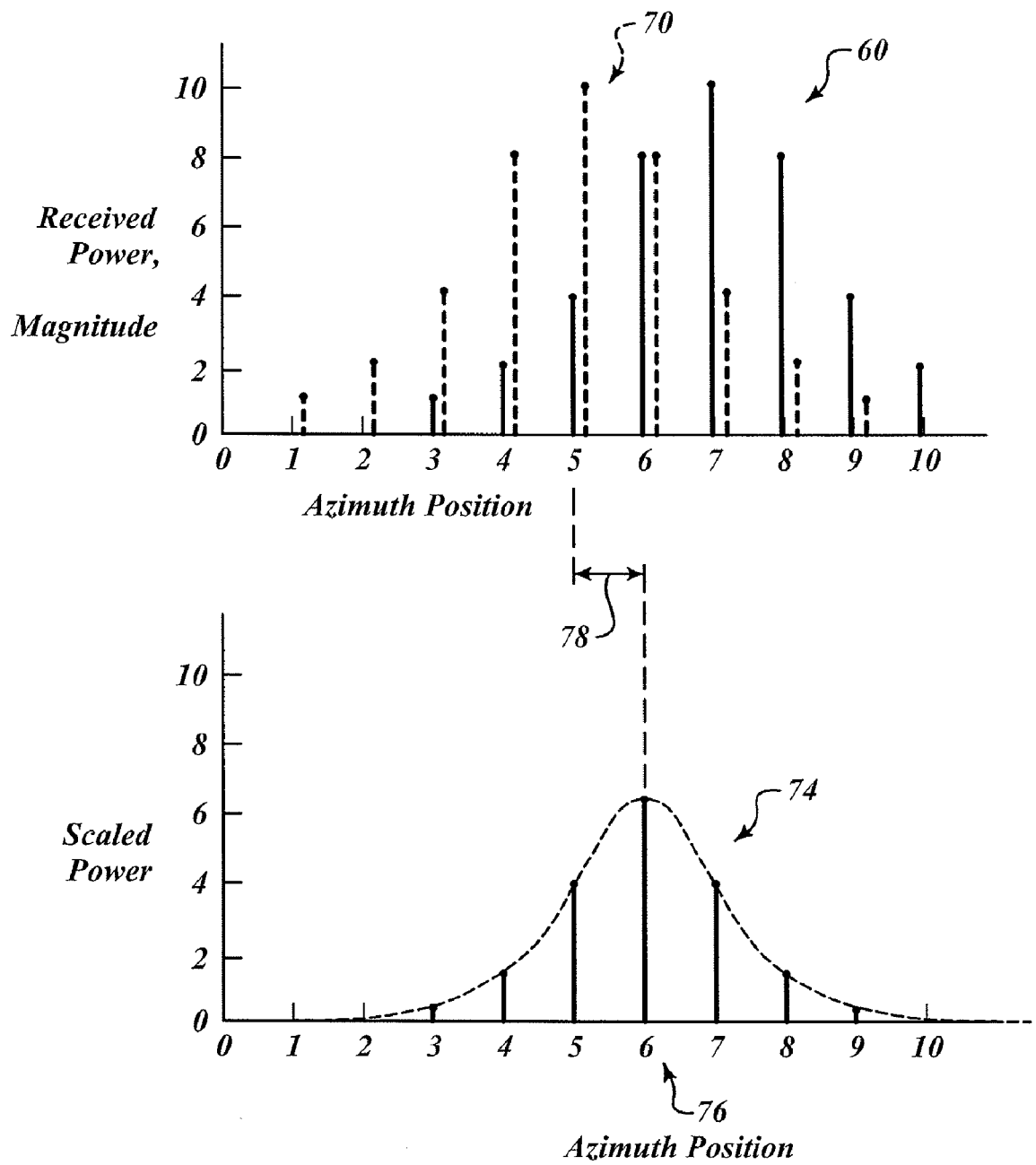
FIG. 10 shows on a first and second plot the responses of FIG. 8, except with the window function mean positioned at azimuth direction 5.
Figure 11:
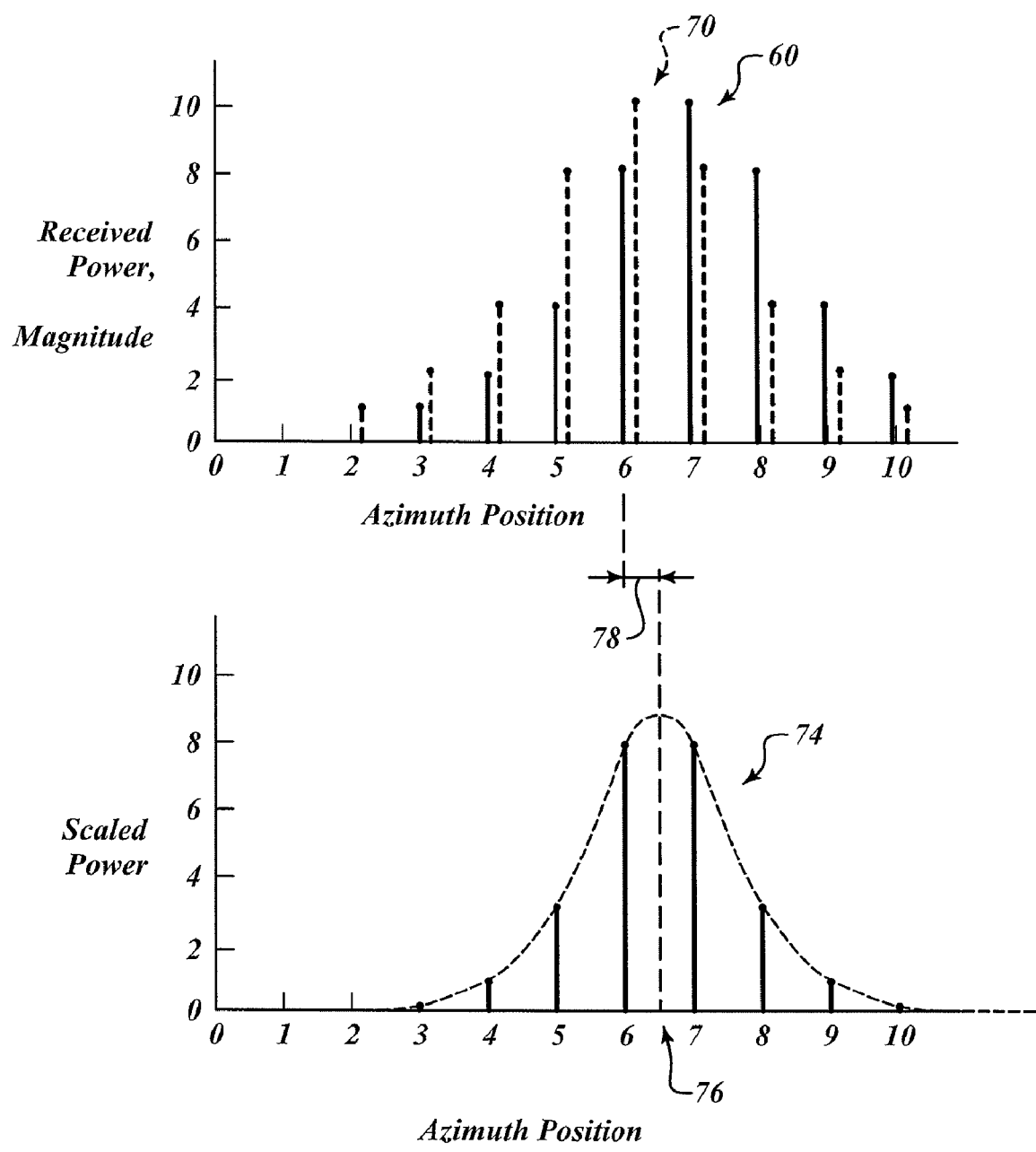
FIG. 11 shows on a first and second plot the responses of FIG. 8, except with the window function mean positioned at azimuth direction 6.
Figure 12:
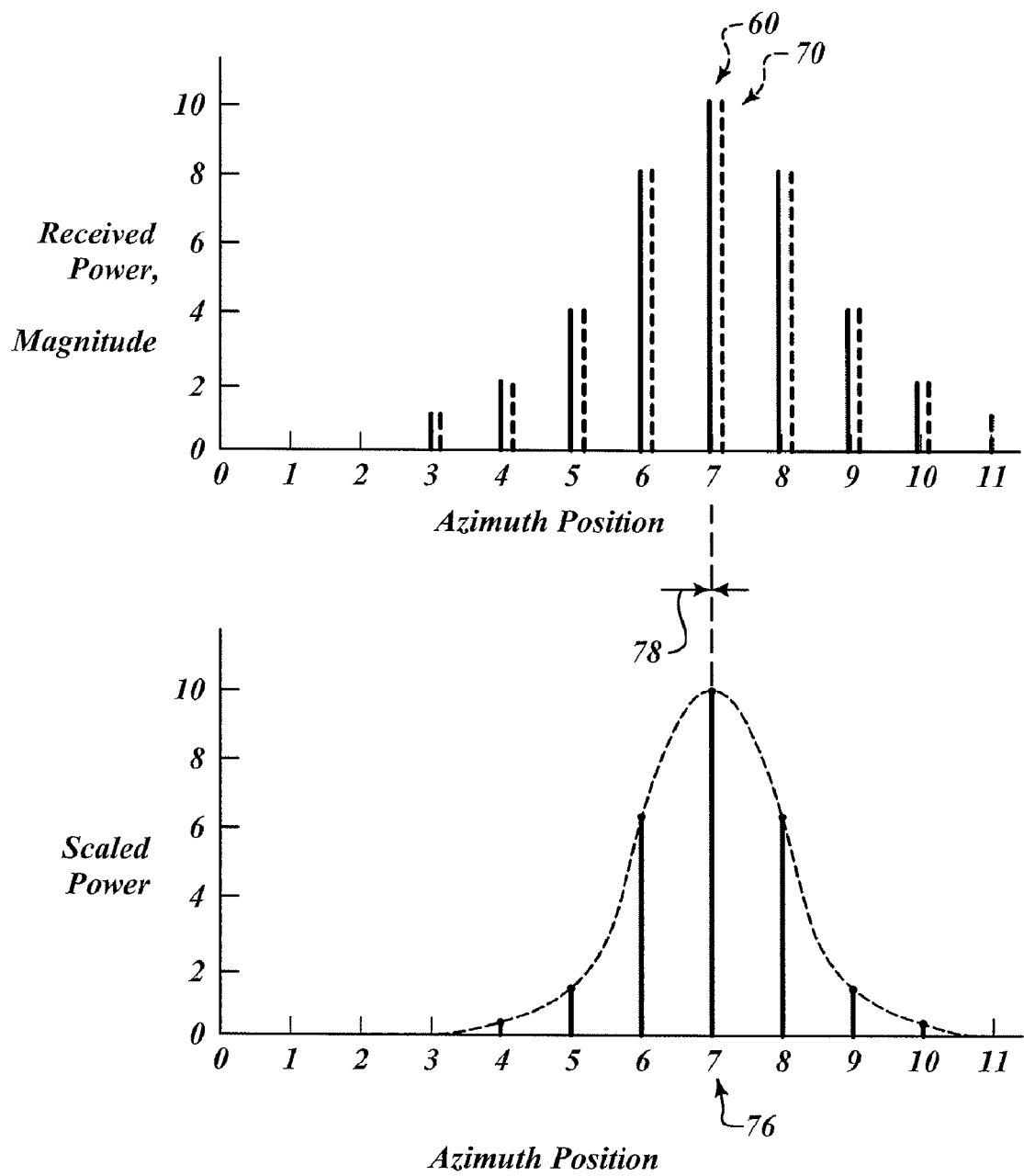
FIG. 12 shows on a first and second plot the responses of FIG. 8, except with the window function mean positioned at azimuth direction 7.

As shown in FIGS. 10-12, the operations within the image enhancement method 28 are repeated for a series of positions of the window function 70 on the azimuth 43. There is a product function 74, and a new estimated target location 88 and reflected power value 80 for each position of the window function 70.

Figure 13:
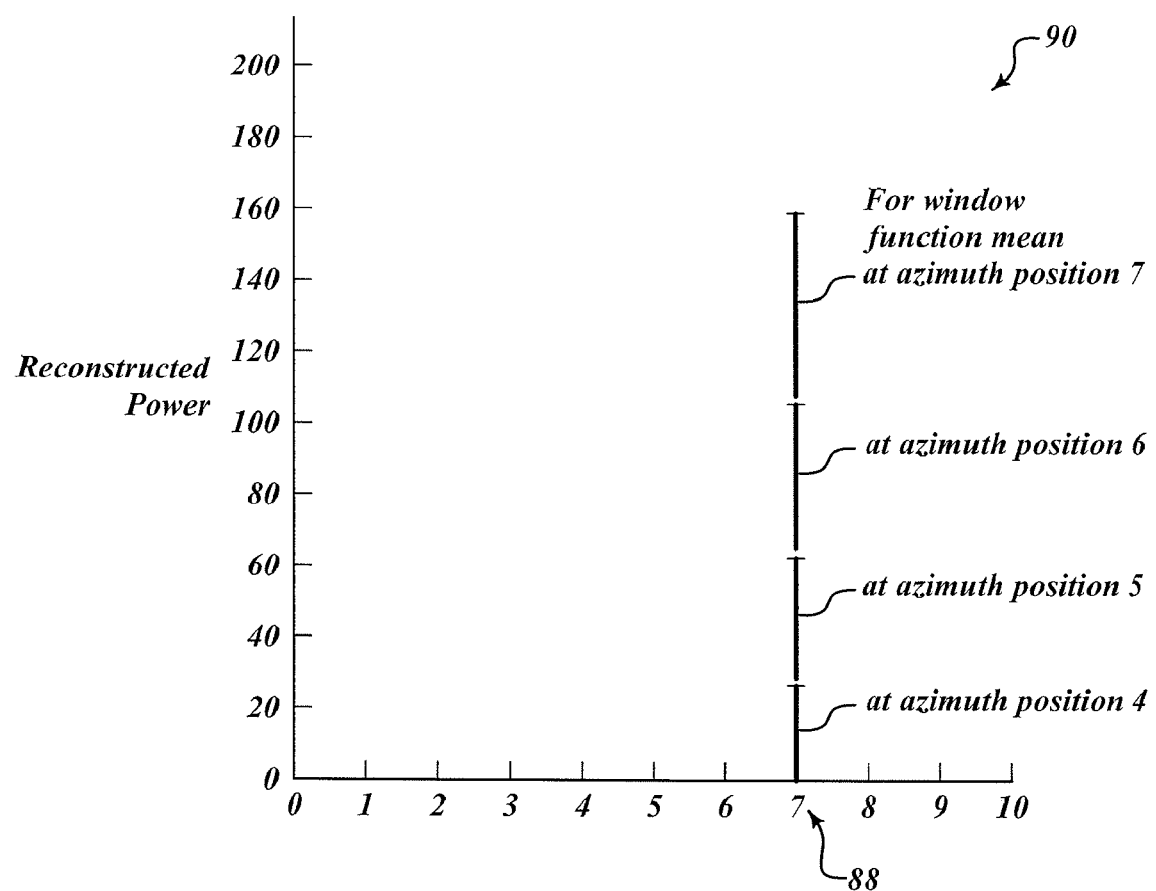
FIG. 13 shows a plot of the reconstructed power azimuth bin array summed for the product functions of FIGS. 8 and 10-12.

As shown in FIG. 13, repeated execution of the image enhancement method 28 leads to an accumulation of added reflected power values 80 in the same or nearly the same bin as the estimated target location 88. FIG. 13 shows a plot of the reconstructed azimuth bin array 90 for an incomplete series of window function positions (only directions 4-7), but demonstrates that over repeated iterations of the image enhancement method 28, the reconstructed azimuth bin array 90 increases the reflected power value stored in bins close to the target location, and reduces the reflected power value in bins of the array away from the target.

While the preferred embodiment of the invention has been illustrated and described, as noted above, many changes can be made without departing from the spirit and scope of the invention. For example, the invention can be practiced with equal success using various techniques for selecting a window function. One skilled in the art would also acknowledge that the multiplication factor of two used in the calculation of the azimuth bin offset could be varied. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An apparatus for acquiring and displaying a radar image, the apparatus comprising:
    an antenna configured to receive a reflected radar signal;
    a processor configured to convert the received radar signal into a received power function versus azimuth, including generate a map image from the received power function versus azimuth by multiplying the received power function versus azimuth by a window function; and
    a map display configured to display a resolution-enhanced map image based on the received radar signal.

2. The apparatus of claim 1, wherein the antenna is configured to scan an azimuth.

3. The apparatus of claim 2, wherein the processor is configured to multiply for a plurality of positions of the window function along the azimuth.

4. The apparatus of claim 1, wherein the processor is configured to:
    create a received power azimuth bin array;
    calculate a window function from the antenna beam response pattern;
    calculate at least one product function by multiplying the received power azimuth bin function by the window function;
    calculate an estimated azimuth bin offset based on the mean of the product function;
    calculate an azimuth position of an estimated target location based on the azimuth bin offset; and
    add a reflected power value corresponding to the integral of the product function to an element of the reconstructed azimuth bin array corresponding to the estimated target location, thereby enhancing the resolution of the map image developed from the received radar signal.

5. The apparatus of claim 4, wherein the processor is further configured to calculate a plurality of product functions for a plurality of positions of the window function along the azimuth, the individual product functions corresponding to individual window function positions.

6. The apparatus of claim 5, wherein the processor is further configured to add at least one reflected power value to at least one value stored in an element of the reconstructed azimuth bin array, whereby the element of the reconstructed azimuth bin array corresponds to the azimuth position of the estimated target location.

7. The apparatus of claim 6, wherein the processor is further configured to substitute a pattern of values stored in the reconstructed azimuth bin array for the received power azimuth bin array, whereby the resolution of the map image becomes enhanced.

8. The apparatus of claim 4, wherein the processor is further configured to calculate the estimated azimuth bin offset by subtracting the azimuth position at the window function mean from the azimuth position at the product function mean, multiplying by two and rounding to the nearest integer.

9. The apparatus of claim 4, wherein the processor is further configured to calculate the estimated target location by adding the azimuth bin offset to the azimuth position of the window function mean.

10. A method for acquiring and displaying a radar map image, the method comprising:
- pointing a radar antenna in a first direction along an azimuth;
- receiving at the radar antenna a reflected radar signal when pointed at the first direction along the azimuth;
- repeating the steps of pointing and receiving for a plurality of predefined directions along the azimuth;
- converting the plurality of received radar signals into a bin array of received power versus azimuth,
- generating a map image from the bin array of received power versus azimuth using a pre-defined window function; and
- displaying the map image on a map display.

11. The method of claim 10, wherein generating a map image comprises:
- creating an azimuth bin array;
- calculating a window function from the antenna beam response pattern;
- calculating at least one product function by multiplying the received power azimuth bin array by the window function;
- calculating an estimated azimuth bin offset based on the mean of the product function;
- calculating the azimuth position of an estimated target location based on the azimuth bin offset; and
- adding a reflected power value corresponding to the integral of the product function to an element of a reconstructed azimuth bin array corresponding to the estimated target location, thereby enhancing the resolution of the map image generated from the received radar signal.

12. The method of claim 11, wherein calculating at least one product function comprises calculating a plurality of product functions for a plurality of positions of the window function along the azimuth, the individual product functions corresponding to individual window function positions.

13. The method of claim 12, wherein adding a reflected power value comprises adding at least one reflected power value to at least one value stored in an element of the reconstructed azimuth bin array, whereby the element of the reconstructed azimuth bin array corresponds to the azimuth position of the estimated target location.

14. The method of claim 13, wherein generating a map image comprises substituting a pattern of values stored in the reconstructed azimuth bin array for the received power azimuth bin array, whereby the resolution of the map image becomes enhanced.

15. The method of claim 11, wherein calculating the estimated azimuth bin offset comprises subtracting the azimuth position at the window function mean from the azimuth position at the product function mean, multiplying by two and rounding to the nearest integer.

16. The method of claim 11, wherein calculating the estimated target location comprises adding the azimuth bin offset to the azimuth position at the window function mean.

* * * * *